United States Patent [19]

Scott et al.

[11] 4,433,581

[45] Feb. 28, 1984

[54] OFFSHORE PLATFORM STRUCTURAL ASSESSMENT SYSTEM

[76] Inventors: David R. Scott, 44064 N. 28th St., Lancaster, Calif. 93534; Thomas S. Rhoades, 420 Buckeye Dr., Colorado Springs, Colo. 80919

[21] Appl. No.: 333,746

[22] Filed: Dec. 23, 1981

Related U.S. Application Data

[60] Division of Ser. No. 265,031, May 18, 1981, which is a continuation-in-part of Ser. No. 86,772, Oct. 22, 1979, Pat. No. 4,287,511.

[51] Int. Cl.$^3$ .............................................. G01M 5/00
[52] U.S. Cl. ...................................... 73/786; 364/508
[58] Field of Search ................ 73/786, 849, 765, 772, 73/787, 799; 364/508

[56] References Cited

U.S. PATENT DOCUMENTS

| | | | |
|---|---|---|---|
| 3,755,658 | 8/1973 | Walters | 73/772 X |
| 4,185,280 | 1/1980 | Wilhelm | 364/508 X |
| 4,304,135 | 12/1981 | Peterson et al. | 73/799 |

Primary Examiner—Jerry W. Myracle
Attorney, Agent, or Firm—William H. Drummond

[57] ABSTRACT

A system for assessing the structural integrity of offshore drilling platforms employs structural moment detector and associated electronics, microprocessor and software, which monitors the condition of the offshore platform structure and continuously provides useful information concerning the effects of external forces on the structure and its remaining life.

1 Claim, 5 Drawing Figures

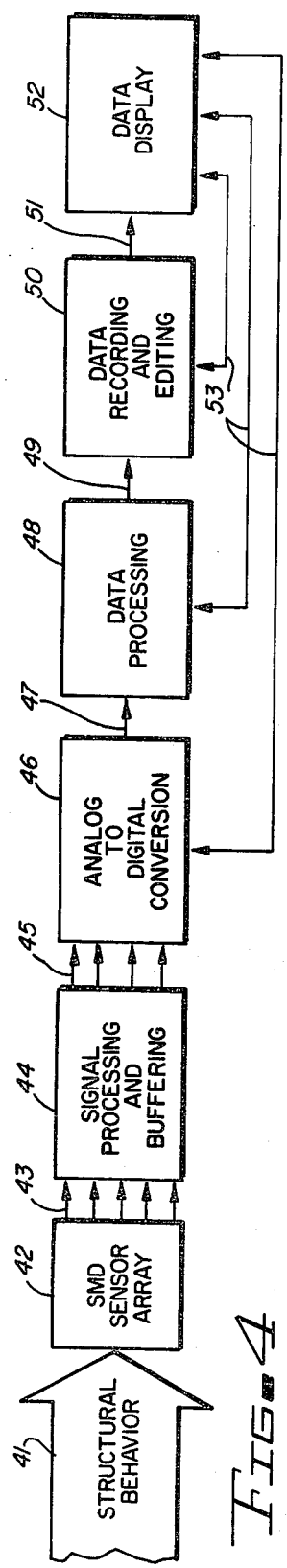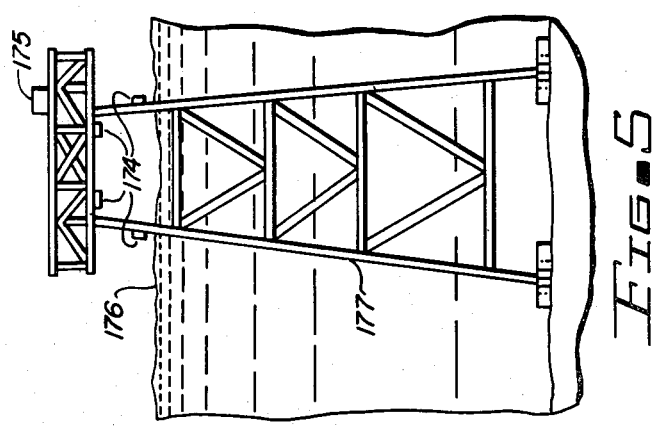

OFFSHORE PLATFORM STRUCTURAL ASSESSMENT SYSTEM

This application is a division of co-pending application Ser. No. 265,031, filed May 18, 1981, entitled "System for Assessing the Integrity of Structural Systems", which is, in turn, a continuation-in-part of co-pending application Ser. No. 86,772, filed Oct. 22, 1979, entitled "Intrusion Alarm System Utilizing Structural Moment Detector As Intrusion Sensor and as Receiver for a Mechanical Intrusion and Command Signal", now issued as U.S. Pat. No. 4,287,511.

This invention relates to systems employing structural moment detectors for collecting and interpreting data reflecting the effect of at least a selected one of a plurality of forces acting on a structure.

In a further aspect the invention pertains to such systems for assessing the integrity of a structure.

In yet another respect the invention pertains to such systems for measuring loads applied to a structure or measure the ability of a structure to carry its design load.

In still another aspect the invention relates to such systems which are employed to improve basic physical measurement schemes.

In another and more particular aspect, the invention pertains to systems for assessing the structural integrity of offshore drilling platforms.

BACKGROUND OF THE INVENTION

Structural moment detectors, which are basically autocollimators which are insensitive to linear dynamic motion but which respond to angular deflection of one end of the sensor with respect to the other, are known in the art. For example, such sensors are disclosed in the patent to Rossire, U.S. Pat. No. 3,229,511 and in the publication entitled "The Structural Rigidity Sensor: Applications in Non-Destructive Testing", published by the Air Force Systems Command, United States Air Force (Frank J. Seiler, Research Laboratory, Publication SRL-TR-75-0017, October 1975). See also the U.S. Pat. to Okubo Nos. 4,159,422 issued June 26, 1979 and 4,164,149 issued Aug. 14, 1979.

Systems which employ structural moment detectors to measure and record certain effects of forces acting on a structure are also disclosed in the publications described above. For example, the Rossire patent discloses an aircraft attitude control system in which a structural moment detector is used to sense wing loading and automatically adjust the attitude of the aircraft to maintain wing loading within safe operational limits. The Air Force publication and the Okubo patents disclose systems which employ structural moment detectors to obtain the "vibration signatures" of various structures such as airframes, buildings, aerospace vehicles, rotating machinery bearings, dams, and the like.

SUMMARY OF THE INVENTION

The present invention relates to improvements in the prior art systems described above and to novel end-use applications of the structural moment detector and systems which include the structural moment detector as an integral element.

These systems and applications can, for convenience, be roughly categorized, as follows (it being understood that some of these systems and applications may overlap or fall into more than one category):

Basic Measurement Systems
Structural Integrity Measurement Systems
Applied Structural Measurement Systems
Applied Load Measurement Systems
Applied Communication-Detection Systems Although the details of each such system and/or end-use application will vary somewhat, in general they will comprise a system for collecting and interpreting data reflecting the effect of at least a selected one of a plurality of forces acting on a structure and will include at least one structural moment detector carried by the structure for generating output signals in response to the plurality of forces acting on the structure, means for processing the output signals to modify the information content thereof (including rejecting components of said signals which reflect extraneous forces other than the selected one) and means for manipulating the processed signals to provide secondary signals which are responsive to the condition of the structure as a result of the application of the selected force.

As used herein the term "forces acting on a structure" is intended to include not only primary external forces applied to the structure but also includes secondary external or internal effects which flow from the application of external forces or changes in the environment of the structure, such as, for example, strain energy released within the structure as a result of cracking, thermal stresses, gravity-induced effects, electromagnetic forces and stresses, and the like.

BRIEF DESCRIPTION OF THE DRAWINGS

FIG. 4 is a schematic illustration of the general system of the invention;

FIG. 5 depicts a system for assessing the structural integrity of offshore drilling platforms.

DESCRIPTION OF THE PREFERRED EMBODIMENTS

As used herein, the term "structural moment detector" means a device which measures the integral of the structure moment between two points on the structure. Such devices are known in the art, but, for clarity, a typical structural moment detector will be briefly described in FIGS. 1-4 and the accompanying descriptive material.

Figure 1:
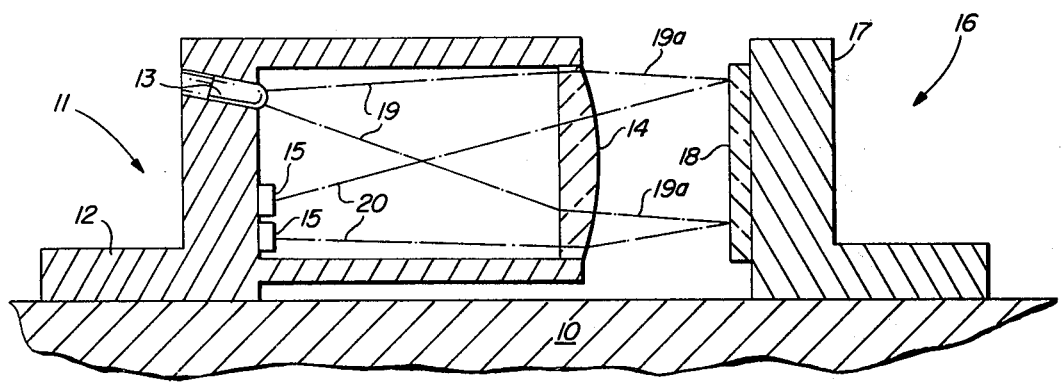
FIG. 1 is a sectional view of a typical structural moment detector which is used in the systems and end-use applications of the invention.
Figure 2:
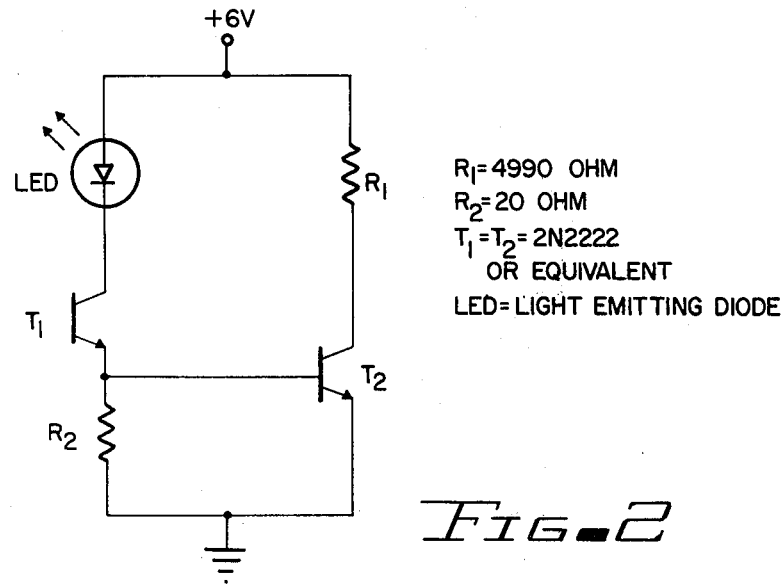
FIG. 2 is a typical schematic of the LED driver circuit of the structural moment detector of FIG. 1.
Figure 3:
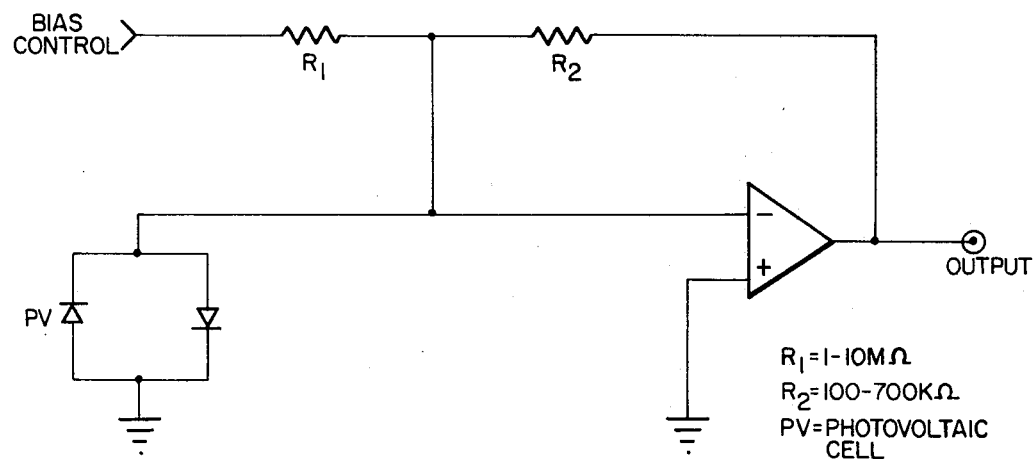
FIG. 3 is a typical schematic of the readout electronics circuits of the structural moment detector of FIG. 1.

Although FIGS. 1-3 and the accompanying descriptive material refer to one particular form of structural moment detector, it will be understood by those skilled in the art that the term "structural moment detector" is intended to include other forms of the device which function in the same basic manner.

The structural moment detector is basically an autocollimator that is insensitive to linear dynamic motions but responds to angular deflection of one end of the sensor with respect to the other. Referring to FIG. 1, the structural moment detector consists of two separate parts which are mounted at spaced locations on a beam 10. One of the parts 11 is a support bracket 12 which carries a light-emitting diode (LED) 13, a collimating lens 14 and dual photovoltaic detectors 15. The other part 16 of the structural moment detector consists of a support bracket 17 which carries a plane front mirror 18. The two parts 11 and 16 are suitably joined by a bellows or other hood member (omitted for clarity of illustration) to exclude extraneous light. The LED 13 emits an infrared light beam 19 which is collimated by the collimating lens 14. The collimated light beam 19a impinges on the mirror 18 and, as indicated by the dashed lines 20, is reflected back through the collimating lens 14 to the photovoltaic cells 15. Angular motions, but not linear motions, of the mirror 18 result in varying amounts of infrared radiation reaching each of the photovoltaic cells 15. The difference in voltage output of the photovoltaic cells 15 is then proportional to the angular motion of the mirror 18 with respect to the cells 15.

When mounted on structural building components such as floor, ceiling or wall beams, such structural moment detectors can measure the deflection of the beam with a resolution of 1 milliarc second ($4.85 \times 10^{-9}$ radians) with a range of $\pm 6$ arc seconds. Where such accuracy is not required, such devices can be fabricated which have a resolution of at least 1 arc second with a dynamic range of $\pm 3°$. Such devices are capable of operating from DC to 50 MHz, the upper limit being established by the frequency limitation of the photovoltaic cells.

Typical circuits which are used in conjunction with the mechanical components of the structural moment detector of FIG. 1 are illustrated in FIGS. 2 and 3. FIG. 2 is a schematic diagram of a suitable LED driver circuit which is a simple constant current source circuit which is required to provide a light source with constant light intensity. A typical suitable readout circuit is illustrated in FIG. 3, which depicts an analog output circuit consisting of a first stage amplifier with common mode rejection that permits linear operation of the photovoltaic cells.

The operation of the structural moment detector can be illustrated by reference to a simplified example of a cantilevered beam which is loaded and the structural moment detector is mounted at points a and b located near the supported end of the cantilevered beam. If the deflection of the beam is measured as $\theta$, the angle between surface tangents at points a and b, the output voltage of the photovoltaic cells is proportional to this angle and, according to the Area Moment Theorem $$V_{out} \propto \theta = \frac{\int_a^b M dx}{EI} = \frac{1}{EI} \int_a^b M dx$$

where
M is the applied moment between points a and b
E is the modulus of elasticity
I is the moment of inertia
$\theta$ is the angular difference between surface tangents at points a and b
x is the linear surface distance between points a and b.

If a load P is placed on the end of a beam of length L and $\delta$ is the distance between points a and b, then $$V_{out} \propto \theta = \frac{1}{EI} \frac{PL\delta}{2}$$

To illustrate the sensitivity of the structural moment detector, a load of 1 gram was placed on the end of an 8" cantilevered beam. The device was mounted near the support of the beam such that points a and b were 1.5" apart. With this load $$V_{out} = 30 \text{ millivolts}$$

and $$\theta = 1.3 \times 10^{-7} \text{ radians}.$$

Since it is impossible to load a structure without changing the total moment which occurs between two points on the structure, it is possible to use the structural moment detector as an extremely accurate and extremely sensitive sensor having a range which far exceeds that of conventional sensors of the prior art.

The general system of the invention is schematically illustrated in FIG. 4. As shown in FIG. 4, the structural behavior 41, which is effected by the forces acting on the structure, are sensed by an array 42 of structural moment detectors (SMD's), located on the structure. The SMD's 42 are located on the structure so as to provide primary electronic signals 43 which are proportional to the structural behavior parameter of interest. The primary electronic signals 43 from the SMD array 42 are fed to signal processing and buffering equipment 44, which includes electronic circuitry which modifies the information content of the primary signals 43 (e.g., rejection of background noise, rejection of signal components induced by other forces, etc.) and which electrically isolate the sensors from the remainder of the system. The processed signals 45 are then transmitted to analog-to-digital converters 46 which convert the analog information in the processed signals 45 to a digital format compatible with various digital processors, recorders, editors and/or display units. The digital signals 47 are then transmitted to a data processor 48 which will usually be a single-frame computer which is capable of accepting digital data and manipulating it in a predetermined, programmable fashion, in order to convert the digitized measurement information into a digital representation of the desired system data. The digital representation data 49 is optionally transmitted to data recording/editing equipment 50 which may provide for permanent recording of all or part of the acquired data for later use and which may, additionally, provide manual editing capability. The recorded and/or edited data 51 may optionally be transmitted to data display equipment 52 which provides visual display of the acquired data and, additionally, may provide for the predetermined alteration of the means by which the data processing equipment 48 is transforming acquired data or the manner in which data is digitized, recorded, edited and/or displayed. Feedback loops 53 may be optionally provided, through which the information at one stage is fed backwardly and/or forwardly to another stage of the system to provide improved accuracy, estimation, prediction or other similar functions. These feedback paths may be electrical, optical, mechanical and/or may involve human interpretations and adjustments.

Various improved systems and applications which embody the present invention will be discussed below in the groups of categories previously indicated.

Offshore structures installed in hostile waters such as the North Sea, the China Sea, and the waters near Australia and New Zealand can be subjected to structural loadings far exceeding those experienced in the Gulf of Mexico. Several studies have dealt with the analysis and design of these structures for structural integrity (fatigue loading, earthquake loading, and wave loading). These efforts concentrate on determining the stress-concentration factors at the nodes of the frame structures. Such efforts result mainly in the structural design of offshore platforms with large safety factors for structural fatigue. Little, if any, effort is expended to determine real time estimates of the structural forces or the ability of the structure to continue to carry its load when the platform is in use. If a system for obtaining such estimates were available, the estimates could be used to provide design feedback to the structural design process, real time assessment of the structural integrity, and advanced warning of incipient failure.

The primary reason for the absence of such a system is the lack of reliable, accurate instruments and associated components to provide the structural information necessary for assessment of structural integrity. The most recent attempt in this area uses acoustic detectors that quantitize the acoustic energy levels. Unfortunately, these systems have high equipment costs, low production yields, and marginal fire risks. In addition, they measure a physical parameter that is not directly related to structural integrity.

Offshore platform structural integrity assessment involves at least three basic objectives. The first objective is an assessment of the remaining fatigue lifetime the structure possesses. If the initial distribution of flaws is known or assumed from statistical information; and information relative to critical crack lengths, crack growth mechanisms; etc. is known (or assumed from statistical information), then if the load history applied to the structure is measured, an estimate can be made of the remaining fatigue lifetime. This can also be accomplished through interpretation of the changes in natural frequency of the structural members or through direct measurements of flexural rigidity.

The second objective is to measure failure mechanisms in the structure itself. If cracks are detected as they occur, and if one acquires information on crack growth in real time on the structure, then an assessment of the severity of a crack can be made as it occurs.

The third objective is simply to observe the point at which the structure exceeds its design loads. For loads above some limiting value, inspections are required. This invention addresses all three of these concepts.

The structural moment detector directly measures the flexural rigidity (1/EI) of the member on which it is mounted. Hence, the measurement is a direct measure of the ability of the structure to carry its load or a design load. When used in a dynamic measurement mode, the SMD can provide a direct measurement of the natural frequency of the structure to which it is mounted. This allows for a direct measurement of incipient buckling (natural frequency approaching zero) or a measurement of tension fracture (natural frequency increasing above specified limit). In addition, appropriate signal processing equipment provides a direct measurement of the structural transfer function between multiple points of the structure allowing for the identification of changing structural characteristics.

Thus, this embodiment of the invention will provide for monitoring the condition of the structure in real time, continuously, with a permanent record and a prediction of the remaining lifetime of the structure.

The system replaces as many conventional sensor systems as possible and thus standardize the various instrumentation systems currently utilized.

The information provided by this system will provide:
1. Failure Detection and Warning
2. Determination of Load Bearing Capability of Structural Members
3. The Detection and Location of Remote Cracks
4. Design Criteria and Validation Because of the unique environment and structural requirements of offshore platforms, this embodiment of the invention also has the following characteristics:
1. Unambiguous warning of structural failure.
2. Automatic monitoring techniques not requiring access.
3. Reliable operation under the most severe loading (weather) conditions.
4. Non-interference with normal operations.
5. Minimization of undersea installation, inspection, maintenance and repair.

Referring to FIG. 5, these characteristics are provided by attaching an array of sensors 174 to the platform 177 above the waterline 176. These sensors 174 are coupled with an electronics-data processing-display package 175 to enable the system to detect and locate crack initiation and propogation despite a random noise environment. The noise rejection or discrimination is provided by adaptive digital filtering techniques.

Having described our invention in such clear and concise terms to enable those skilled in the art to understand and practice it, we claim:

1. A system for collecting and interpreting data reflecting the effect of at least a selected one of a plurality of forces on an offshore platform structure, said system comprising, in combination:
(a) at least one structural moment detector carried by said structure for generating output signals in response to said plurality of forces acting on said structure;
(b) means for processing said output signals to modify the information content thereof, including rejecting components of said signals which reflect the effects of extraneous forces other than said selected one;
(c) means for manipulating said processed signals to provide secondary signals responsive to the condition of said structure as a result of the application of said selected force.

* * * * *